Oct. 14, 1969

F. C. McCOY ET AL 3,472,600

HEATER AND SIGNAL LIGHT DEVICE

Filed Nov. 13, 1967

United States Patent Office 3,472,600
Patented Oct. 14, 1969

3,472,600
HEATER AND SIGNAL LIGHT DEVICE
Frederic C. McCoy, Beacon, and Edwin C. Knowles, Poughkeepsie, N.Y., assignors to Texaco Inc., New York, N.Y., a corporation of Delaware
Filed Nov. 13, 1967, Ser. No. 682,463
Int. Cl. F23b 7/00; F23d 3/02
U.S. Cl. 431—206           4 Claims

ABSTRACT OF THE DISCLOSURE

A heating and light signal device which employs a heat conducting sleeve within a container filled with a solid fuel on top of which a wicking agent rests. The heat conducting sleeve is supported by an annular member which rests on the walls of the container.

BACKGROUND OF THE INVENTION

Field of the invention

This invention relates to an improvement in apparatus for keeping railway switches and rails clear of interference by snow and ice during inclement cold weather. This invention also relates to an improved device for keeping ornamental bushes, flowers, vegetables and low growing agricultural plants sufficiently warm during periods of frost so that there is no frost destruction thereto. Additionally, this invention relates to improvements in apparatus for an emergency light source, using a solid fuel during periods of inclement weather especially for airplane runways when rain, snow or fog camouflage the same from landing aircraft.

DESCRIPTION OF THE PRIOR ART

Railway switches must be protected against malfunction due to snow and ice during the winter months in many parts of the country. One of the common means of achieving this protection is the use of kerosene heaters especially designed for this service. Some of the larger railway yards have over one thousand switches, each of which may require as many as six heaters. These units burn continuously in snow and sleet storms and on occasion may burn continuously for several days. Because the unit must be placed under the switch and between the ties, the height and width are each limited to about 8 inches.

Presently used heaters are expensive in both initial cost and maintenance. Further, these heaters require liquid fuel such as kerosene which is easily spilled and can present a fire hazard.

Protection of living plants against freezing temperature and its resulting damage is of paramount importance to fruit growers, vegetable farmers, and ornamental nursery men. Freezing temperatures can occur any time depending upon the area as a result of a generalized cold snap or be localized where cold and warm air stratify.

Various means have been used to combat frost damage when falling temperatures threaten. The most wide-spread method has been to burn solid and liquid combustible material in the locus of the living plants to warm the ambient air. However, the solid combustible materials are usually quite tall and designed to protect large fruit trees rather than lower ornamental plants, vegetable crops and dwarf fruit trees. Liquid combustible materials can damage the agricultural plant by spillage of the liquid fuel on or near the plant.

Many of the combustible items used to illuminate areas such as airplane runways during periods of precipitation and/or fog burn for only a short period of time or use liquid combustible materials which are awkward. Also many of the present means of emergency illumination are not very highly luminous.

When a solid fueled device is used which is short, there is either too little fuel to burn for a desirable long period or the device is so wide that much of the limited liquified fuel is drained away from the wicking agent and the burning time shortened thereby.

SUMMARY

It is an object of the present invention to provide a solid fuel heater low enough to be useful in protecting switches in railroad yards from freezing up in inclement weather.

It is a further object of the present invention to provide a heater which is low to the ground and capable of being burned for long periods of time.

It is an additional object of the present invention to provide an emergency illuminating device which has a high degree of luminosity.

These and other objects and advantages of the present invention will appear more clearly from the following description setting forth the invention in detail.

In an embodiment of the present invention there is described a combustible heating and lighting device having an outer container wherein solid fuel is stored. A wicking agent is supported upon the fuel. A heat conducting sleeve is suspended within the container by an annular member positioned on the top of the container.

BRIEF DESCRIPTION OF THE DRAWING

The present invention will be further illustrated by reference to the drawings in which.

DESCRIPTION OF THE PREFERRED EMBODIMENT

Figure 1:
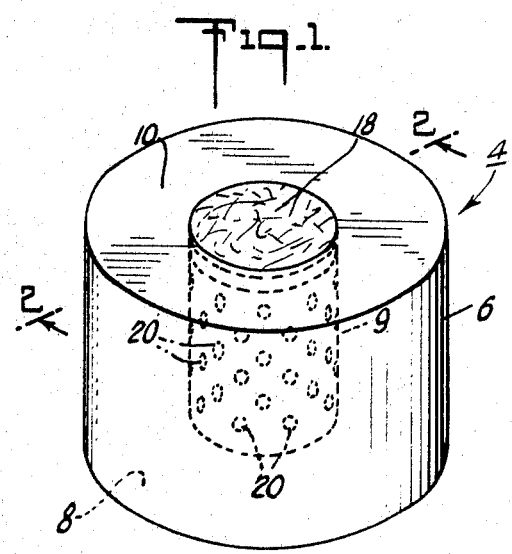
FIG. 1 is an isometric view of an embodiment of a solid fuel heater of the present invention, with parts cut away.
Figure 2:
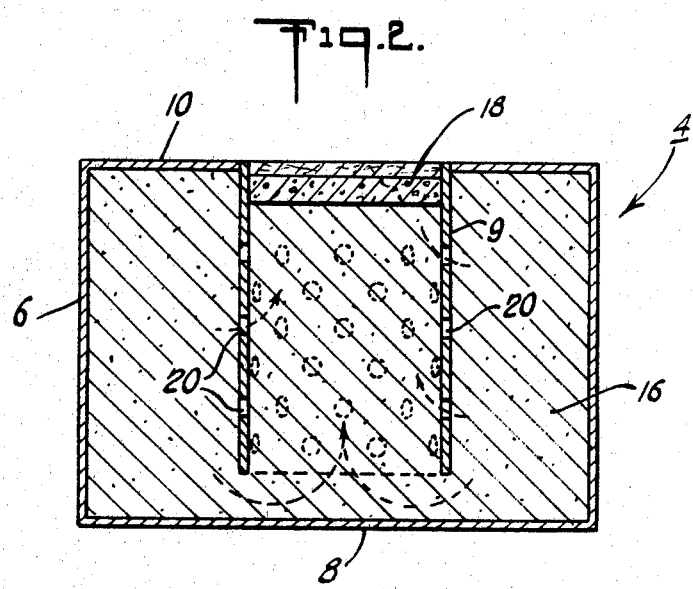
FIG. 2 is a vertical cross section of the heater shown in FIG. 1.

Referring to FIGS. 1 and 2, a specific embodiment of a heating and illuminating device of the present invention includes a container 4 having a cylindrical wall 6 which is fabricated from aluminum foil-coated paper and a base 8 fabricated from a non-porous material such as metal. A heat conducting sleeve 9 is supported from an annular member 10 which bears upon the top edge of the wall of the container 4. The heat conducting sleeve 9 is supported about a ¼ inch above the base 8 of the container 4. Alternately, the lower portion of the sleeve can be notched or punched out to accomplish the same effect. A further alternate would be to support the sleeve on short legs of a desired height. The container 4 is filled with a fuel 16, which usually is solid at ambient temperature and pressure.

For fabrication a pre-established amount of the solid fuel is cast into the container 4 to within ⅛ inch of the top. The heat conducting sleeve, if not unitary with the container can be inserted into the fuel while still molten. A buoyant wicking agent 18 is placed on top of the solid fuel 16. This wicking agent 18 is placed within the heat conducting sleeve 9. The wicking agent can be fabricated from 4/8 grade ground cork, vermiculite or perlite. However, any organic or inorganic particulate material which floats on molten fuel may be used.

The fuel which is solid at ambient temperature and atmospheric pressure is made from slack waxes or petrolatums alone or in combination. When additional heat is desired to be given off by the inventive device, added amounts of paraffin base gas oil up to 30% can be blended with the wax or petrolatum. When the waxes are used in conjunction with paraffin base gas oil, the wax crystals are held within the oil matrix so that there is a homogeneous mixture of paraffin base gas oil and wax throughout.

For illumination purposes, wax alone is a suitable fuel. However, for heating purposes 1 to 30 percent of paraffin base gas oil is desirable. The preferred mixture for heating railroad switches is 20 percent paraffin base gas oil and 80 percent wax.

The heat conducting sleeve 9 is made of metal, preferably ordinary tin plate. A small bead can be made around the upper circumference of the sleeve 9 to fasten it to its associated annular member 10. The length of the sleeve 9 is designed to assure that the bottom clears the base 8 of the outer container 4. Alternately, the bottom of the sleeve can be notched. Another embodiment would have the annular member 10 brazed to the heat conducting sleeve 9. The depth of the heat conductive sleeve is preferably 4½ inches in a 5½ inch high outer container. The outer container and heat conductive sleeve usually are cylindrical in shape and with the above heights, the outer container is 8 inches in diameter and the heat conducting sleeve is 3¼ inches in diameter.

In order to prevent rain or melted snow from flowing into the burning fuel, the annular member 10 may contain a circular flange, about ⅜" high surrounding the top of the heat-conducting sleeve. Or the heat-conducting sleeve itself may extend about ⅜" above the annular member.

The heat conducting sleeve 9 has a number of perforations 20 in its wall. These holes allow the flow of liquified heated fuel to pass from the reservoir space between the outer container 4 and the heat conducting sleeve 9 to the interior of the heat conducting sleeve. These perforations 20 are especially helpful during the transient stage of melting and consuming the solid fuel when the heater is initially lighted, to insure a ready supply of fuel to the flame. The following are examples of the heat of combustion given off per hour by selected fuels. The container used is 8 inches in diameter and 5⅜ inches high. It is a 3-ply aluminum foil-coated kraft paper can with a metal bottom.

The paraffin wax can be a crude slack wax that may be partially refined, a scale wax, a refined wax or a mixture of such waxes. The microcrystalline wax can be a tank bottoms wax, a residual microcrystalline wax or a mixture of such waxes. Typical physical properties for a suitable paraffin wax include a melting point temperature of 150° F. and an oil content of about 15%.

The wicking material can be an inorganic, substantially non-combustible microfiberous material, such as asbestos, glass, rockwool and the like including mixtures thereof or an organic, non-fusible microfiberous material, such as glass fibers of various types, such as soda-lime glass fibers, borosilicate (Pyrex) fibers and lead glass, fibers, asbestos fibers and quartz fibers or mixtures thereof. These inorganic microfibers are at least substantially insoluble in non-reactive liquid hydrocarbons. However the wicking agent must be capable of floating on molten fuel either by itself or when supported upon a second particulate material capable of floating the agents on molten fuel. The preferred type of wicking agent is set forth in the table.

In addition, there has been found that during periods of heavy gales coupled with either rain or snow that a few strands, for example, 3, of ⅝ inch diameter cotton wicking placed on top of the cork asbestos provided needed assistance in sustaining the initial flame.

A sheet metal container is desirable when the container is to be refilled for repeated use. Due to the heat conductivity of metal, the heat conductive sleeve is tapered toward the base. Such tapering of the sleeve gives a more uniform burning rate due to the narrowing burning area thus balancing heat output. A convenient size container would be 12" in diameter and 5" high with a heat conductive sleeve which is 6" in diameter at the top and 4" in diameter at the bottom with a ¼" clearance from the base.

We claim:
1. A meltable solid fuel heating and lighting device within a container having upstanding sidewalls and a bottom, a heat conducting sleeve having perforations formed in its walls, means supporting said sleeve upright

| Experiment | Fuel | Wick | Burning time (hours) | Burning rate (g./hr.) | B.t.u./hr. |
| --- | --- | --- | --- | --- | --- |
| 1 | Wax A | Cork abestos [1] | 54 | 50 | 2,000 |
| 2 | 50% Wax A, 50% Wax B | do.[1] | 30 | 90 | 3,800 |
| 3 | Wax B | do.[1] | 26 | 105 | 4,400 |
| 4 | 80% Wax B, 20% paraffin base. Gas oil | do.[1] 3 strands of ⅝" diameter cotton wicking on top of the cork asbestos. | 19 | 145 | 6,000 |

[1] Wick was fabricated from 3 grams of 4/8 grade granulated cork supporting 2 grams of Paperbestos No. 3 (Johns-Manville grade of chrysotile asbestos fiber group 7 of Quebec Asbestos Producers Association).
Wax A—melting point of 147° F. to 154° F. and a 15% maximum oil content. Wax B—melting point of 130° F. to 136° F. and a 15% maximum oil content.

From the above table, it can be seen that variations in the solid fuel can be used to obtain specific heat outputs commensurate with a desired burning period since specific heat and burning period are dependent relations.

The term "wax" in the specification and claims is employed in a generic sense to define both natural animal or mineral waxes, synthetic waxes and substances chemically similar to waxes, wax substitutes and wax equivalents. Among such substances are the hydrocarbon waxes including ceresin or ozocerite, and microcrystalline types such as wax tailings, mineral bees wax, and the like, vegetable waxes such as carnauba, montan and others, and animal waxes such as stearin, stearic acid, bees wax, tallow spermaceti and the like. Also synthetic waxes such as hydrogenated montan wax and higher alcohols.

The preferred wax component is a petroleum wax and may be a paraffin or microcrystalline wax or a mixture thereof. Such waxes are normally solid at ambient temperature and are composed of long chain aliphatic hydrocarbons.

within said container in a position spaced from said upstanding side walls, a buoyant wick formed of particulate material within said sleeve capable of floating on the melt of said solid fuel, said container and said sleeve being adapted to contain a meltable solid fuel so that ignition of said fuel at said wick melts said fuel adjacent said wick within said sleeve and heats said sleeve to conduct heat downwardly and outwardly to melt fuel adjacent and outside said sleeve whereby fuel melted outside said sleeve may pass inwardly thru said perforations and solid fuel in said container may be substantially totally burned in a controlled even manner.

2. A solid fuel heating and lighting device substantially as defined in claim 1, wherein said sleeve is tapered toward the bottom of said container, whereby the burning rate of said container is more uniform due to the narrowing burning area to balance the heat output.

3. A solid fuel heating and lighting device substantially as defined in claim 1, wherein said container is cylindrical.

4. A solid fuel heating and lighting device substantially as defined in claim 3, wherein said container is between 8″ and 12″ in diameter and between 5″ and 5½″ high and said sleeve is between 3¼″ and 6″ in diameter.

References Cited
UNITED STATES PATENTS

| | | | |
|---|---|---|---|
| 35,154 | 5/1862 | Houchin | 431—298 |
| 186,101 | 1/1877 | Benson | 431—323 |
| 192,378 | 6/1877 | Levine | 431—323 |
| 397,011 | 1/1889 | Leynen-Hougaerts | 431—298 |
| 1,123,268 | 1/1915 | Foltzer | 431—206 |
| 2,246,346 | 6/1941 | Carroll | 431—298 |
| 3,261,346 | 7/1966 | Waddell et al. | 431—291 |
| 3,327,505 | 6/1967 | Brown | 431—288 |

FREDERICK L. MATTESON, Jr., Primary Examiner
ROBERT A. DUA, Assistant Examiner

U.S. Cl. X.R.
431—298